United States Patent [19]
Tomita

[11] Patent Number: 5,115,334
[45] Date of Patent: May 19, 1992

[54] OPTICAL SCANNING DEVICE

[75] Inventor: Kan Tomita, Tokyo, Japan

[73] Assignee: Ricoh Company, Ltd., Tokyo, Japan

[21] Appl. No.: 673,387

[22] Filed: Mar. 22, 1991

[30] Foreign Application Priority Data

Apr. 9, 1990 [JP] Japan .................................... 2-93676

[51] Int. Cl.$^5$ ...................... G02B 26/08; G02B 13/08; G02B 3/08
[52] U.S. Cl. .................................... 359/216; 359/197; 359/668; 359/742
[58] Field of Search ............... 359/197, 202, 205, 207, 359/209, 212, 216, 217, 668, 742; 250/234–236

[56] References Cited

U.S. PATENT DOCUMENTS 4,563,056  1/1986  Tagawa et al. ...................... 359/205
4,915,484  4/1990  Yamamoto .......................... 359/668

Primary Examiner—Bruce Y. Arnold
Assistant Examiner—James Phan
Attorney, Agent, or Firm—Oblon, Spivak, McClelland, Maier & Neustadt

[57] ABSTRACT

An optical scanning device comprising a light source which emits a luminous flux for irradiating a scanning surface and comprises a semiconductor laser element and an anamorphic ellipsoidal Fresnel lens. The device further comprises a rotary polygon mirror having reflection surfaces for deflecting the luminous flux emitted from the light source. The device further comprises an image forming optical system disposed between the polygon mirror and the scanning surface for forming an optical spot image from the luminous flux on the scanning surface. The optical spot is arranged to scan the scanning surface in a horizontal scanning direction and a vertical scanning direction. The optical system is so arranged that the reflection surface and the scanning surface are positioned at conjugate points with respect to each other for the luminous flux with regard to the vertical scanning direction.

4 Claims, 2 Drawing Sheets

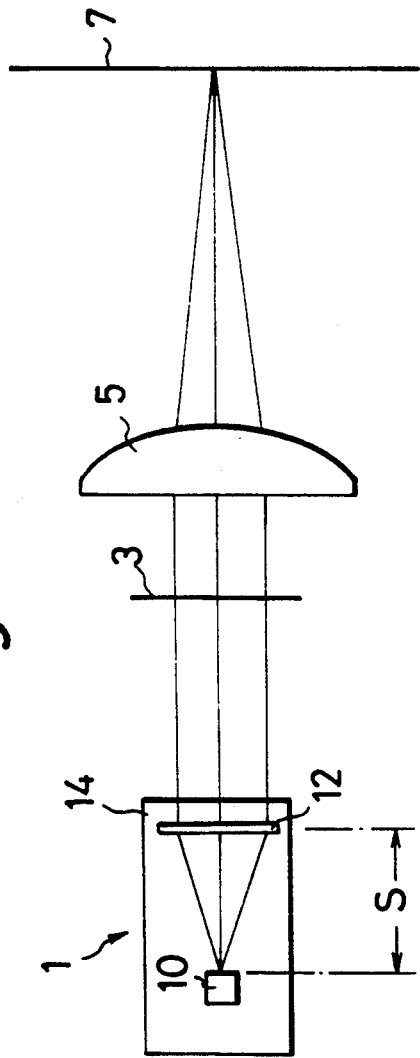
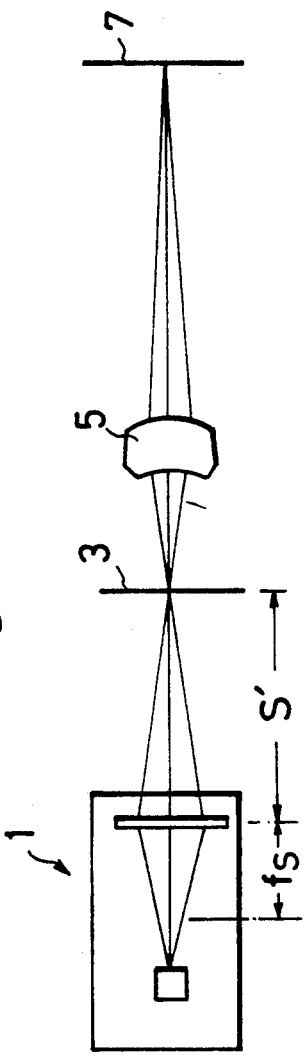

OPTICAL SCANNING DEVICE

BACKGROUND OF THE INVENTION

1. Field of the Invention

The present invention relates to an optical scanning device.

2. Description of the Related Art

A related art optical scanning device comprises a light source which emits luminous flux of laser, a rotary polygon mirror which deflects the luminous flux from the light source, and an optical system for imaging and guiding the deflected luminous flux to form an optical spot on a scanning surface so that the surface is scanned by the optical spot.

The luminous flux emitted from a semiconductor laser source is divergent. Therefore, the light source comprises a collimator lens to collimate the laser flux.

These days, it has been required to raise the functional speed of the optical scanning operation. To raise the scanning speed, it is necessary to increase the numerical aperture of the collimator lens so as to efficiently use the luminous amount of the laser beam emitted from the light source. However, when the numerical aperture is to be increased, the number of lens elements constituting the collimator lens has to be also increased, which raises the cost of the lens.

Also, using the rotary polygon mirror involves a problem of the mirror surface inclination. To cope with the problem, it has been arranged so that the collimated flux is converged in the sub-scanning direction (vertical scanning direction) by a cylindrical lens so as to form a vertical line image on the deflection mirror surface of the polygon mirror and that the imaging optical system is arranged to be anamorphic so that, with respect to the vertical scanning direction, the reflection surface of the mirror and the scanning surface to be scanned are arranged optical geometrically in conjugate relation with respect to each other. However, to make such an arrangement, it becomes very troublesome to adjust the position of the cylindrical lens along the optical axis of the lens and the rotational position about the optical axis.

SUMMARY OF THE INVENTION

It is therefore an object of the present invention to provide a novel optical scanning device which can efficiently utilize the luminous flux from the light source and correct the surface inclination of the polygon mirror, and has a simple construction, reducing the cost thereof.

The above mentioned object of the present invention can be achieved by an optical scanning device comprising:

a light source which emits a luminous flux for irragiating a scanning surface and comprises a semiconductor laser element and an anamorphic ellipsoidal Fresnel lens;

a rotary polygon mirror having reflection surfaces for deflecting said luminous flux emitted from said light source; and an image forming optical system disposed between said polygon mirror and said scanning surface for forming an optical spot image from said luminous flux on said scanning surface, said optical spot being arranged to scan said scanning surface in a horizontal scanning direction and a vertical scanning direction, said optical system being so arranged that said reflection surface and said scanning surface are positioned at conjugate points with respect to each other for the luminous flux with regard to said vertical scanning direction.

More precisely, the optical scanning device in accordance with the present invention comprises a light source, a rotary polygon mirror to deflect the luminous flux emitted from the light source, and an image forming optical system for converging the deflected flux to form an optical spot on a surface to be scanned.

The image forming optical system is arranged to make the reflection surface of the polygon mirror conjugate with the scanning surface optical geometically with respect to the vertical scanning direction.

The light source comprises a semiconductor laser device in conjunction with an anamorphic ellipsoidal Fresnel lens assembled as one unit.

The ellipsoidal Fresnel lens is arranged in such a manner that the apsides line direction thereof corresponds to the direction of maximum divergent light emitted from the laser source and that the apsides line direction also corresponds to the main scanning direction (horizontal scanning direction).

The scanning device satisfies $$f_M > f_S > 0 \text{ and } S > f_S$$

wherein $f_M$ represents the focal length of the lens with respect to the apsides line direction, $f_S$ represents the focal length of the lens with respect to the minor axis thereof, and S represents the distance between the semiconductor laser emission point and the lens.

An advantage of the above mentioned arrangement of the optical scanning device in accordance with the present invention is that the divergent luminous flux of laser can be efficiently treated due to the arrangement in which the apse line of the ellipsoidal Fresnel lens corresponds to the direction of maximum divergent luminous flux of the laser, which results in that the direction of minimum divergent luminous flux of the laser corresponds to the minor axis of the lens.

Another advantage of the arrangement of the present invention is that the luminous flux emitted from the light source becomes always convergent with respect to the vertical scanning direction since the device satisfies the condition of $$f_M > f_S > 0 \text{ and } S > f_S.$$

Still another advantage of the present invention is that the Fresnel lens can be made at a low cost since the mask of the metallic mold of the lens can be easily produced by using a stepper system comprising LSIs or an electron beam drawing system.

Further objects and advantages of the present invention will be apparent from the following description of the preferred embodiments of the invention as illustrated in the accompanying drawings.

BRIEF DESCRIPTION OF THE DRAWINGS

FIG. 1a is a horizontal plan view showing the essential structure of the optical scanning device in accordance with an embodiment of the present invention;

FIG. 1b is a vertical side view of the structure of FIG. 1a;

FIG. 3b is a vertical side view of the structure of FIG. 3a.

DESCRIPTION OF THE PREFERRED EMBODIMENTS

Embodiments of the present invention are described hereinafter with reference to the drawings.

FIGS. 1a and 1b illustrate an embodiment of the present invention. FIG. 1a represents a horizontal plan view of the construction of the optical scanning device from the light source thereof to the surface to be scanned. FIG. 1b represents the vertical side view of the scanning device.

Numeral 1 designates a light source. Numeral 3 designates a reflection surface of a polygon mirror for deflecting the luminous flux emitted from the light source 1. Numeral 5 designates an optical image forming system. Numeral 7 designates a scanning surface to be scanned.

The light source 1 comprises a semiconductor laser device 10 and a ellipsoidal Fresnel lens 12 both being housed in a casing 14 to form one unit being sealed and separated from outside.

Figure 2:
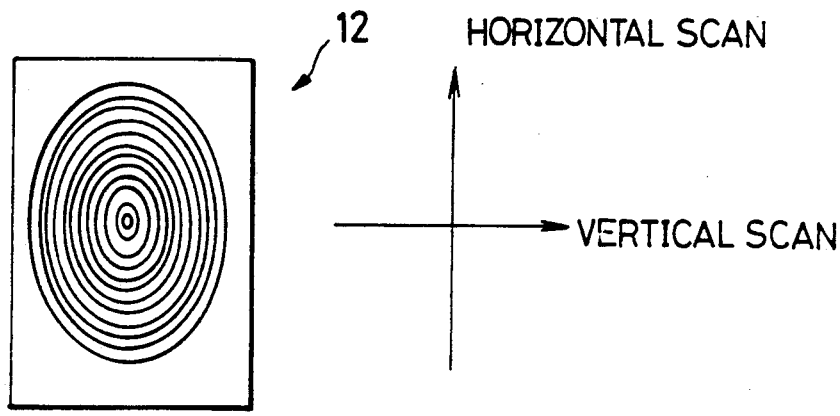
FIG. 2 is an explanatory view of the ellipsoidal Fresnel lens used in the structure of the present invention.

FIG. 2 illustrates the ellipsoidal Fresnel lens 12. The lens is disposed in such a manner that the line of apsides of the ellipsoid is aligned with the direction of the maximum luminous flux of the divergent laser emitted from the laser device 10, that is, the direction of the maximum diameter of the oval laser beam section and that the minor axis of the ellipsoid is aligned with the direction of the minimum luminous flux of the laser, that is, the direction of the minimum diameter of the oval laser beam section. Therefore, in relation to the scanning direction, the direction of the apsides line of the ellipsoidal lens coincides with the main scanning direction, that is, the direction of horizontal scan and the direction of the minor axis of the lens coincides with the sub-scanning direction, that is, the direction of vertical scan.

The focal length $f_M$ with respect to the apse line direction of the lens and the focal length $f_S$ with respect to the minor axis direction of the lens satisfying the following condition.

$$f_M > f_S > 0$$

Therefore, the ellipsoidal Fresnes lens 12 has a positive power in each of the directions of the apse line and the minor axis of the lens.

In this particular embodiment, the luminous emission point of the laser device 10 is positioned on the optical axis of the lens 12 at the focal point with respect to the apse line direction so that $$S = f_M$$

wherein S represents the length from the luminous emission point of the laser device 10 to the lens 12.

Accordingly, the luminous flux after passing through the lens 12 is collimated in the horizontal scanning direction, as illustrated in FIG. 1a, while the flux is converged after passing through the lens 12 in the vertical scanning direction, as illustrated in FIG. 1b.

At around the convergent point of the flux after passing through the lens 12, the reflection surface 3 of the rotary polygon mirror is disposed to reflect the luminous flux converged in the vertical direction. The reflected flux is deflected according as the polygon mirror is rotated. The deflected flux propagates to the optical system 5 for forming image on the scanning surface.

The structure of this embodiment satisfies the following equation $$(1/S') = -(1/S) + (1/f_S)$$

wherein $S'$ represents, as illustrated in FIG. 1b, the distance from the convergent point of the luminous flux in the vertical direction to the back side principal point of the lens 12.

Due to the arrangement of the optical system 5, the infinite point in the object side thereof and the scanning surface are positioned at the conjugate points in relation to each other, with regard to the horizontal scanning direction, as illustrated in FIG. 1a. Also, with regard to the vertical scanning direction, the scanning surface 7 and the reflection surface 3 are positioned at the conjugate points in relation to each other, as illustrated in FIG. 1b.

Accordingly, the luminous flux deflected by the polygon mirror is converged on the scanning surface 7 by the optical system 5 to form an image of optical spot on the scanning surface and scan the surface. In this scanning operation, even if the reflection surface 3 is vertically inclined during the rotary motion of the polygon mirror, the vertical position of the spot is kept unchanged while the spot scans the surface horizontally. Therefore, a reliable scanning operation can be achieved neglecting the influence from the surface inclination of the polygon mirror.

Figure 3A:
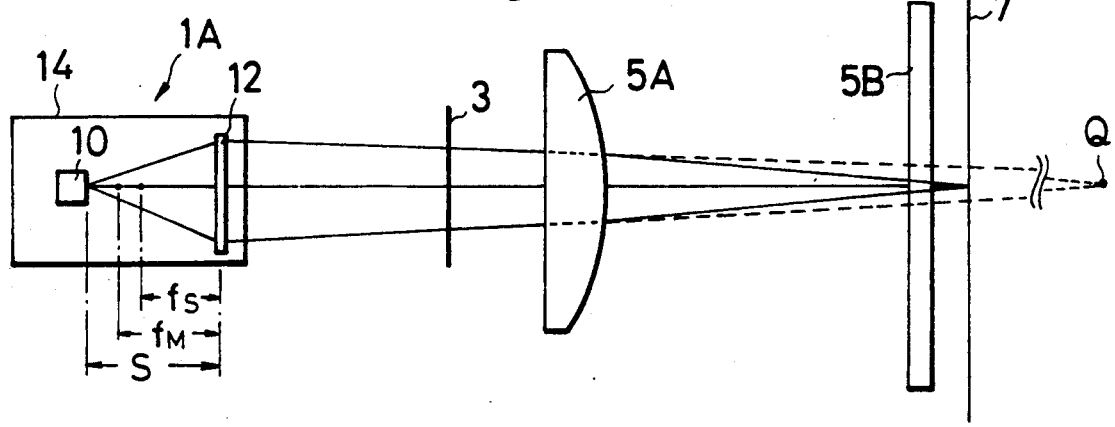
FIG. 3a is a horizontal plan view showing the essential structure of the optical scanning device in accordance with another embodiment of the present invention.
Figure 3B:
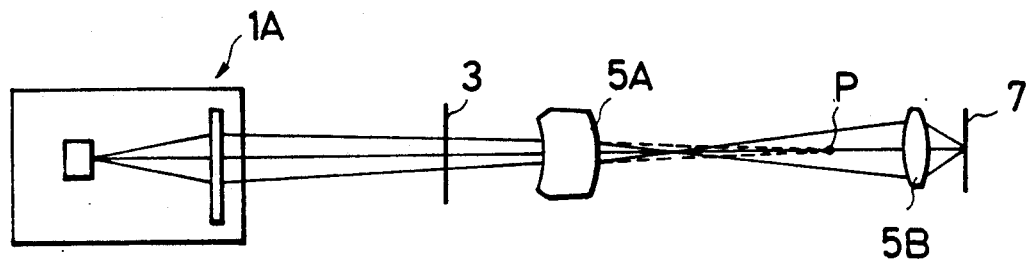

FIG. 3 illustrates another embodiment of the optical scanning device in according with the present invention. The same or corresponding parts are designated by the same reference numerals as the embodiment of FIGS. 1a and 1b.

The structure of the light source 1A of this embodiment is substantially the same as that of the first embodiment mentioned before, except that the distance S between the emission point of the laser device 10 and the lens 12 is arranged longer than the focal length $f_M$ of the lens 12 with respect to the apse line direction thereof. Therefore, the luminous flux becomes convergent after passing through the lens 12 with respect to both of the horizontal scanning direction and the vertical scanning direction.

The optical image forming system comprises a positive lens 5A and a longitudinal cylindrical lens 5B. The lens 5B has a positive power only in the direction of vertical scan.

Therefore, the luminous flux emitted from the light source 1A is converged on the scanning surface 7 with respect to the horizontal scanning direction by the lens 5A. More precisely, the light source 1A emits the luminous flux which converges at a point Q far behind the scanning surface 7. The point Q is a virtual light source for the lens 5A. The lens 5A forms a real image of the point Q on the scanning surface 7.

With regard to the vertical scanning direction, the luminous flux emitted from the light source 1A convergently propagates toward a point P. The convergent luminous flux is input to the lens 5A and converged on the scanning surface 7 by the function of the lenses 5A and 5B.

Due to the arrangement of the lenses 5A and 5B, the scanning surface 7 and the reflection surface 3 are optogeometrically positioned at conjugate points with respect to each other, whereby the surface inclination of the polygon mirror is corrected so that the reliability of scanning operation can be raised.

It is to be noted that it is possible to arrange the above mentioned S, $f_M$, and $f_S$ as $$f_M < S < f_S$$

instead of the arrangement mentioned above.

In that case, the luminous flux emitted from the light source becomes divergent in the horizontal scanning direction while the flux becomes convergent in the vertical scanning direction. Also, the image forming optical system may be constructed as that of FIGS. 3a and 3b wherein the power of the positive lens is strengthened in this case though.

As mentioned above, a novel optical scanning device can be realized in accordance with the present invention.

According to the above mentioned optical scanning device of the present invention, the semiconductor laser can be efficiently used as the scanning beam so that the scanning speed can be raised. Also, it becomes unnecessary to dispose a cylindrical lens for correcting the surface inclination of the polygon mirror between the light source and the polygon mirror, which simplifies the structure and makes it easy to assemble. Further, the cost of the scanning device can be reduced since the ellipsoidal Fresnel lens which is inexppensive can be used.

Many widely different embodiments of the present invention may by constructed without departing from the spirit and scope of the present invention. It should be understood that the present invention is not limited to the specific embodiments described in the specification, except as defined in the appended claims.

What is claimed is:

1. An optical scanning device comprising:

a light source which emits a luminous flux for irradiating a scanning surface and comprises a semiconductor laser element and an anamorphic ellipsoidal Fresnel lens;

a rotary polygon mirror having reflection surfaces for deflecting said luminous flux emitted from said light source; and an image forming optical system disposed between said polygon mirror and said scanning surface for forming an optical spot image from said luminous flux on said scanning surface, said optical spot being arranged to scan said scanning surface in a horizontal scanning direction and a vertical scanning direction, said optical system being so arranged that said reflection surface and said scanning surface are positioned at conjugate points with respect to each other for the luminous flux with regard to said vertical scanning direction.

2. An optical scanning device according to claim 1, wherein said laser element emits a laser beam flux having an oval section, and the element is disposed in such a manner that the direction of the maximum diameter of the flux section coincides with a horizontal scanning direction while the direction of the minimum diameter of the flux section coincides with a vertical scanning direction.

3. An optical scanning device according to claim 2, wherein said ellipsoidal Fresnel lens is disposed in such a manner that the apse line direction of the ellipsoid coincides with said horizontal scanning direction while the minor axis direction of the ellipsoid coincides with said vertical scanning direction.

4. An optical scanning device according to claim 3, which satisfies the following relations:

$$f_M > f_S > 0 \text{ and } s > f_S$$

wherein $f_M$ represents the focal length of the lens with respect to the apsides line direction, $f_S$ represents the focal length of the lens with respect to the minor axis thereof, and s represents the distance between the semiconductor laser emission point and the lens.

* * * * *